United States Patent Office 2,727,045
Patented Dec. 13, 1955

2,727,045

PREPARATION OF ALKYLAMINOANTHRAQUINONES

Justin A. McSheehy, Somerville, N. J., assignor to The American Cyanamid Company, New York, N. Y., a corporation of Maine No Drawing. Application December 13, 1952,
Serial No. 325,887

9 Claims. (Cl. 260—378)

This invention relates to the manufacture of amino anthraquinone or amino derivatives of anthraquinone and related compounds. More specifically, my invention relates to a direct process for the manufacture of compounds have the formula

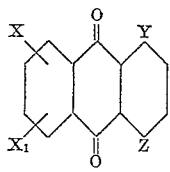

in which X and $X_1$ are substituents selected from the group consisting of hydrogen, halogen, hydroxyl, cyano, and nitro radicals, and X may be identical with $X_1$; Y is a substituent selected from the group consisting of amino, mono alkyl amino and mono hydroxyalkyl amino radicals; and Z is a substituent selected from the group consisting of hydroxyl, amino, mono alkyl amino, and mono hydroxyalkyl amino radicals.

Substituted anthraquinones of this class are important articles of commerce. For example, after proper physical formulation, they are excellent dyestuffs for cellulose acetate fibers; they are used for dyeing plastics, probably by virtue of solubility in them; they are used for coloring gasoline and oils, and having high thermal stability, they are satisfactory for use in colored smokes, military signals and other pyrotechnics.

In the past, the preferred method of manufacture has been that of condensing leuco quinizarine with ammonia or the appropriate amine, which process necessitates first preparing the leuco quinizarine, an expensive and time-consuming step, then oxidizing the leuco diamino compound to the "oxo" or final form. Frequently, this multiplicity of steps results in a substantial loss in yield.

I have now discovered that in the presence of a phenol, excellent yields of amino quinones are obtained in a short period of time under mild conditions, by condensing quinizarine with ammonia, an amine, or mixtures thereof. No preliminary reduction of the quinizarine and no final oxidation of the product are required, and the equipment is very simple. The observed reaction is all the more surprising in that the reaction medium, e. g., a mixture of phenol, alcohol, and water, need not confer an appreciable solubilizing action on the quinizarine. Since many phenols are cheap and available, no effort and expense need be taken to recover them after isolating the product; however, my invention is not intended to exclude such recovery if desired.

In my new process, the desired replacement is effected by the action of ammonia or a primary aliphatic amine directly and without first reducing the anthraquinone compound or employing a reducing agent. Moreover, the desired amino compound is obtained as such and not in the form of a leuco compound requiring further treatment. I have found that the desired direct reaction without necessity for reduction may be effected at atmospheric pressure in the presence of phenols such as cresols, xylenol, naphthol, and the like. Phenol has been found to be especially valuable for the purpose of this invention.

My invention is not critical as to time and temperature. In general, the reflux temperature is preferred for convenience, but high yields may be obtained at considerably lower temperatures by prolonging the time. Neither is my invention critical as to the concentration of reactants.

For some unknown reason, secondary amines, such as diethanolamine; heterocyclic amines, such as morpholine; and aromatic amines, such as toluidine, either do not react with quinizarine under my reaction conditions or form only the mono-substituted derivatives. The present process as it applies to the manufacture of diamino derivatives of anthraquinone is limited to the use of ammonia, primary aliphatic amines or mixtures of primary aliphatic amines. Primary amines containing up to four or five carbon atoms are of special interest in that with their aid it is possible to produce compounds of great value as coloring matters for cellulose acetate. Both low- and high-molecular weight amines give valuable oil-soluble dyes.

As examples of specific compounds which may be prepared in accordance with this invention, we may mention, 1,4-di-(dodecyl amino)-anthraquinone (from quinizarine and lauryl amine); 1,4-(diamino)-anthraquinone (from quinizarine and ammonia); 1,4-di-($\beta$-ethanolamino)-anthraquinone (from quinizarine and monoethanolamine); and 1,4-di-(n-amylamino)-anthraquinone (from quinizarine and n-amylamine).

The invention is illustrated, but not limited, by the following examples, the proportions being given in parts by weight unless otherwise specified.

EXAMPLE 1

*Preparation of 1,4-di-(n-amylamino)-anthraquinone*

To an agitated reactor there was charged in the following order:

100.0 parts phenol
48.2 parts by volume n-amylamine
36.0 parts quinizarine
25.0 parts 50% caustic soda solution The charge was stirred and heated to gentle reflux and held until no further change occurred. The mass was then diluted with a solution containing:

90 parts by volume alcohol
60 parts water

After cooling to approximately 30° C. the crystalline product was isolated by filtration, washed with an aqueous alcohol solution and dried. The blue crystalline product weighed 47.3 parts and by spectrophotometric analysis the material tested 107% when compared with 1,4-di-amylamino) anthraquinone obtained from leuco quinizarine. The product dissolved with a brilliant blue color in organic solvents such as acetone, benzene, toluene, etc.

EXAMPLE 2

*Preparation of 1,4-di-(methylamino)-anthraquinone*

To an agitated vessel was charged the following reagents:

180 parts by volume alcohol
120 parts water
50 parts phenol
25 parts 50% caustic soda solution
49.8 parts by volume aqueous monomethylamine (24.5% by volume
36.3 parts quinizarine The reaction mass was heated to 55° C. and held for three hours. The temperature was then raised to 80° C. and held for three hours. Beautiful red crystals deposited at 80° C. After two hours at 80° C. an additional 10 parts by volume of monomethylamine solution was fed in to replace that lost by vaporization and the heating continued. When the reaction was complete, the reaction mixture was allowed to cool to room temperature and the product isolated as in Example 1. An excellent yield of crystalline product was obtained which by spectro analysis was 30% tinctorially stronger as a blue oil color than the 1,4-di-(n-amylamino)-anthraquinone of Example 1.

EXAMPLE 3

*Preparation of 1,4-di-(ethylamino)-anthraquinone*

This preparation was similar to that of Example 2, except that only five parts of 50% caustic soda solution was used and 42 parts by volume of aqueous monoethylamine (42.6% aqueous solution). The crystalline 1,4-di(ethylamino)-anthraquinone was obtained in excellent yield.

EXAMPLE 4

*Preparation of 1,4-di-(n-butylamino)-anthraquinone*

To an agitated reactor was charged in the following order:

180 parts by volume alcohol
120 parts water
80 parts beta-naphthol
36.3 parts quinizarine
30 parts n-butylamine
25 parts 50% caustic soda solution The charge was heated with stirring to reflux at 85–87° C. and held there for five hours. After one and one-half hours at reflux, the mass had turned dark blue. The mass was cooled to 25–30° C. At 70° C. the product crystallized out in the form of long, bronzy needles. The crystalline mass was filtered and the cake washed with a solution of three parts by volume alcohol and two parts water, until the wash filtrate was a clear, bright blue. It was then washed with cold water until free of alkali and dried at 70° C.

A theoretical yield of 1,4-di-(n-butylamino)-anthraquinone was obtained.

EXAMPLE 5

*Preparation of 1,4-di-(n-butylamino)-anthraquinone*

This preparation was carried out in the same way as Example 4, except that there was charged 55 parts of p-cresol in place of 80 parts of beta-naphthol.

A 90% yield of 1,4-di(butylamino) anthraquinone of excellent purity was obtained.

EXAMPLE 6

*Preparation of 1,4-di-(n-butylamino)-5-chloro-anthraquinone*

5-chloroquinizarine was prepared in accordance with the description given in Example 1 of U. S. Patent No. 2,346,772. The di-butylamine derivative was then prepared according to the procedure of Example 4 using the following proportions:

180 parts by volume alcohol
120 parts water
80 parts beta-naphthol
26.8 parts 5-chloroquinizarine
19 parts n-butylamine
20 parts 50% caustic soda solution A blue crystalline product was obtained which dissolved in benzene with an intense clear blue color.

EXAMPLE 7

*Preparation of 1,4-di-(ethanolamino)-anthraquinone*

To an agitated reactor was charged:
180 parts by volume alcohol
120 parts water
50 parts phenol
5 parts sodium carbonate
36.3 parts quinizarine
31.7 parts ethanolamine The above charge was heated to reflux (85° C.) and held at reflux for five and one-half hours. After cooling to room temperature, the crystalline slurry was filtered and the cake washed as in Example 4 and dried at 75° C.

An excellent yield of the desired 1,4-di(ethanolamino)-anthraquinone was obtained. The product was only sparingly soluble in aromatic hydrocarbon solvents such as benzene and toluene, but readily dissolved in solvents such as alcohol and acetone, with an intense clear blue color. The product analyzed 8.54% nitrogen (theory=8.55%).

EXAMPLE 8

*Preparation of 1-methylamino-4-ethanolamino-anthraquinone*

180 parts by volume alcohol
120 parts water
50 parts phenol
25 parts 50% caustic soda solution
36.3 parts quinizarine
21.3 parts by volume 30% aqueous methylamine
12.4 parts ethanolamine The above charge was heated to reflux (85° C.) over two hours and held at refluxing temperature for 4½ hours. The reaction mixture was cooled to 30° C. and the product isolated in the usual manner.

A good yield of the mixed alkylamino compound was obtained. The product dissolves in organic solvents with an intense blue coloration.

EXAMPLE 9

*Preparation of 1-amino-4-hydroxyanthraquinone*

To a reactor was charged in the following order:
900 parts by volume alcohol
600 parts water
125 parts 50% caustic soda solution
250 parts phenol
218 parts quinizarine
250 parts by volume 30% aqueous ammonia The reactor was sealed to prevent escape of ammonia and the charge was heated with stirring to 85° C. and held for six hours. After cooling to 30° C. the 1-amino-4-hydroxyanthraquinone was isolated by filtering, washed free of alkali, and dried.

An excellent yield of 1-amino-4-hydroxyanthraquinone was obtained. The product analyzed 5.3% nitrogen (theory=5.86%). This material dyed acetate rayon a brilliant red shade.

I claim:
1. A process for replacement by a radical selected from the class consisting of amino, monoalkyl amino and monohydroxy alkyl amino radicals of at least one α-hydroxyl in an anthraquinone of the formula

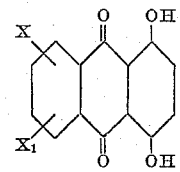

in which X and $X_1$ are selected from the group consisting of hydrogen, halogen, hydroxyl, cyano and nitro radicals; which comprises heating a phenol and an alkali with said anthraquinone and a reactant selected from the group consisting of ammonia, primary aliphatic amines, primary monohydroxy aliphatic amines and mixtures of primary aliphatic amines.

2. A process for replacement by a radical selected from the class consisting of amino, monoalkyl amino and monohydroxy alkyl amino radicals of at least one α-hydroxyl in quinizarine, which comprises heating a phenol and an alkali with quinizarine and a reactant selected from the group consisting of ammonia, primary aliphatic amines, primary monohydroxy aliphatic amines and mixtures of primary aliphatic amines.

3. A process for replacement by a radical selected from the class consisting of amino, monoalkyl amino and monohydroxy alkyl amino radicals of at least one α-hydroxyl in quinizarine, which comprises heating phenol and an alkali with quinizarine and a reactant selected from the group consisting of ammonia, primary aliphatic amines, primary monohydroxy aliphatic amines and mixtures of primary aliphatic amines.

4. A process for replacement by a radical selected from the class consisting of amino, monoalkyl amino and monohydroxy alkyl amino radicals of at least one α-hydroxyl in quinizarine, which comprises heating phenol and an alkali metal hydroxide with quinizarine and a reactant selected from the group consisting of ammonia, primary aliphatic amines, primary monohydroxy aliphatic amines and mixtures of primary aliphatic amines.

5. A process for the manufacture of a compound having the formula

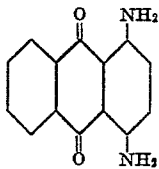

which comprises heating quinizarine and ammonia in the presence of a phenol and an alkali.

6. A process for the manufacture of a compound having the formula

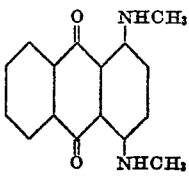

which comprises heating quinizarine and methyl amine in the presence of a phenol and an alkali.

7. A process for the manufacture of a compound having the formula

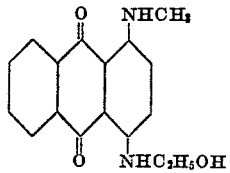

which comprises heating quinizarine and a mixture of methyl and hydroxy ethyl amines in the presence of a phenol and an alkali.

8. A process for the manufacture of a compound having the formula

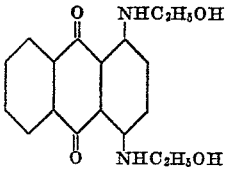

which comprises heating quinizarine and hydroxyethyl amine in the presence of a phenol and an alkali.

9. A process for the manufacture of a compound having the formula

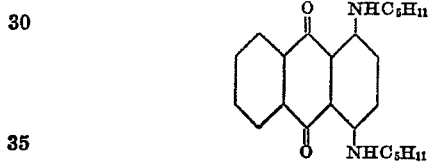

which comprises heating quinizarine and amyl amine in the presence of a phenol and an alkali.

References Cited in the file of this patent

UNITED STATES PATENTS

| | | |
|---|---|---|
| 2,050,660 | Koeberle | Aug. 11, 1936 |
| 2,050,661 | Koeberle | Aug. 11, 1936 |
| 2,183,652 | Lord et al. | Dec. 14, 1939 |